UNITED STATES PATENT OFFICE.

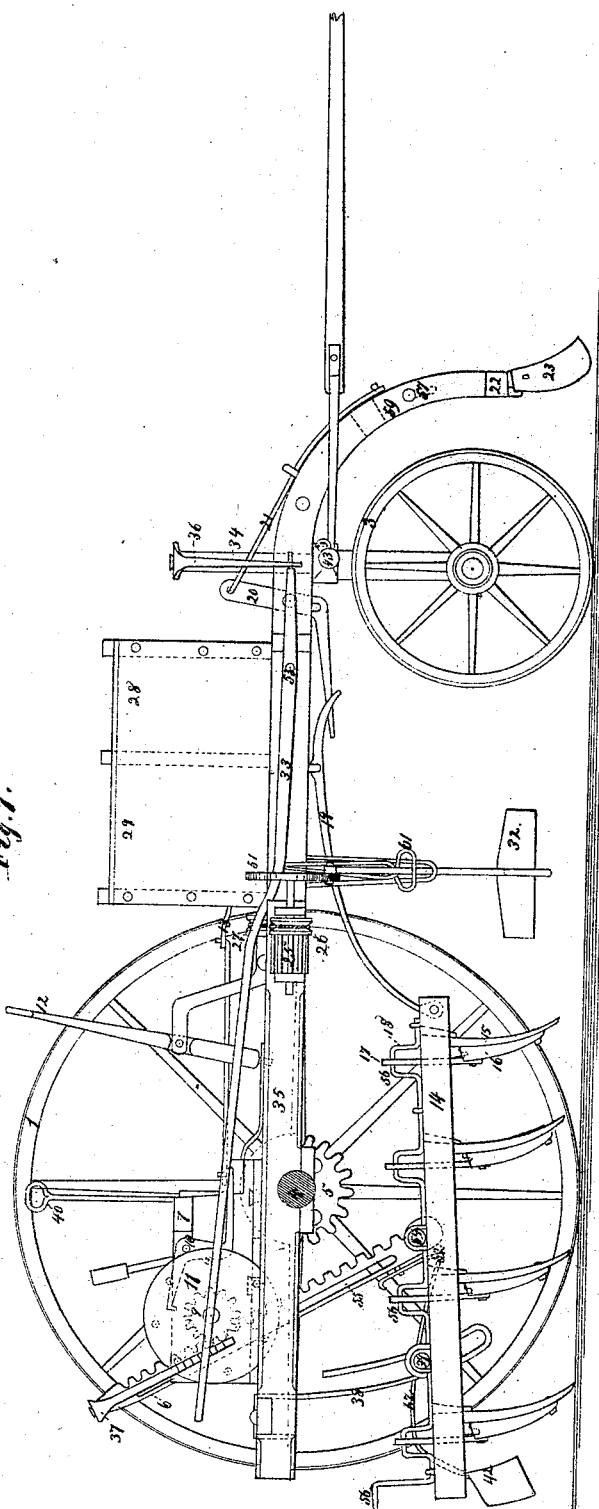

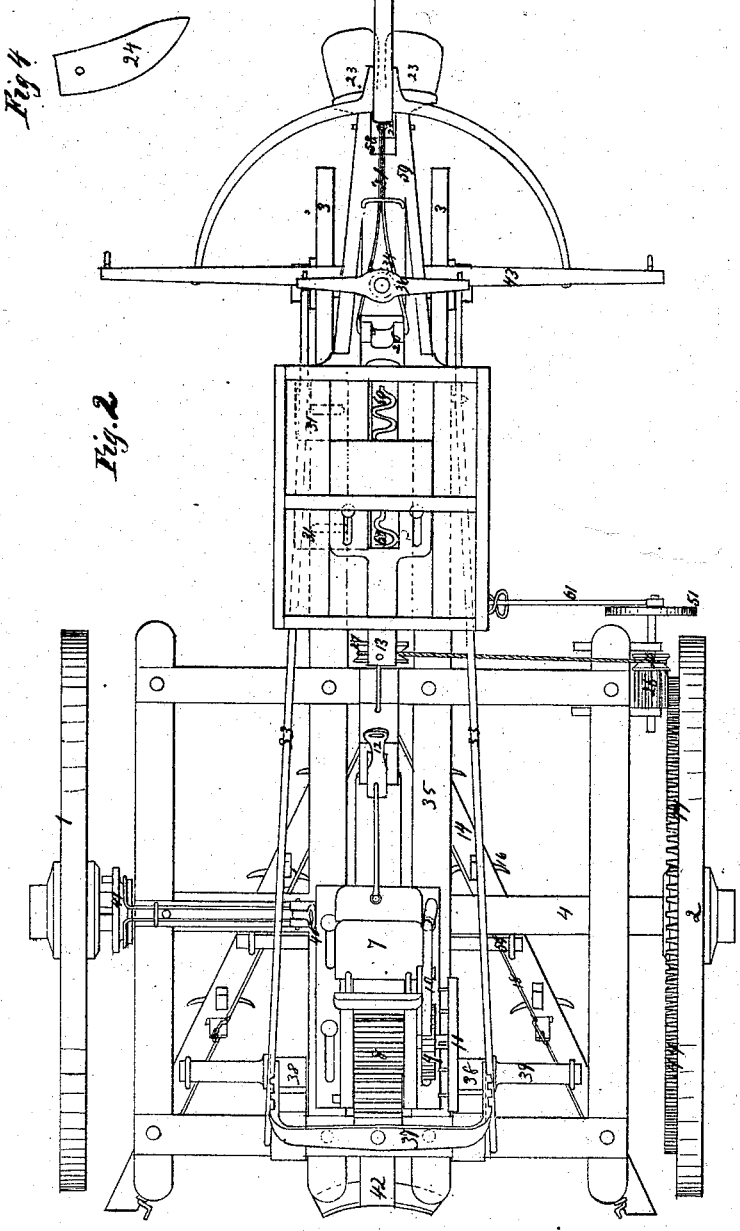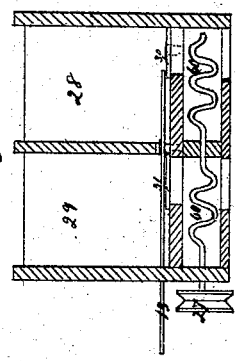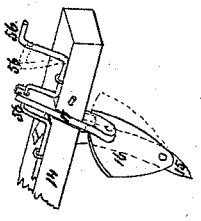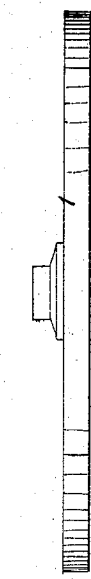

MIREYBEAU B. LAMAR, OF ATLANTA, GEORGIA.

IMPROVEMENT IN COTTON-CULTIVATORS.

Specification forming part of Letters Patent No. 118,371, dated August 22, 1871; antedated August 11, 1871.

*To all whom it may concern:*

Be it known that I, MIREYBEAU B. LAMAR, of Atlanta, in the county of Fulton and State of Georgia, have invented certain new and useful Improvements in Cotton-Cultivators; and I hereby declare the following to be a full, clear, and exact description of the same, reference being had to the accompanying drawing making a part of this specification, in which—

Figure 1 is a side view. Fig. 2 is a plan view. Fig. 3 is a longitudinal section of the hopper. Fig. 4 is a view of the plow-point used in marking the ground for planting the seed, and Fig. 5 is a sectional view of the shifting-wing plows and the cranked lever for adjusting them.

This invention relates to an improvement in machines for cultivating cotton; and consists in combining and arranging several devices into one machine in such a manner that the ground may be plowed and furrowed, the seed planted and guano distributed, and the cotton chopped and cultivated, two or more of the operations being performed at the same time. The plowing is performed by plows set in an angular frame, that may be elevated or depressed by gearing so as to plow deep or shallow, to suit the quality of the land. The plows are provided with shifting-wings that may be set to throw the soil either to or from the center of the machine. When set to throw it to the center a ridge is formed to receive the seed and guano. The machine is moved over the center of the ridge, a plow at its front opening a furrow, into which the seed and guano are fed from the hoppers upon the frame. The wing-plows, being set to throw the soil to the center, follow and cover up the seed and guano. A "knocker-off" is arranged at the rear of the machine, and this, following the wing-plows, knocks off a portion of the soil from the ridge, yet leaves a sufficient covering for the seed. After the cotton comes up the plow that has been used to mark the ground is removed, and two other plows are arranged upon the front of the machine so as to leave a space between them equal to the desired width of the cotton row. The knocker-off is also removed at this time. The machine is run over the ground, the front plows scraping off on both sides of the young cotton and reducing the row to the desired width. A cotton-chopper follows immediately after, chopping out the surplus cotton and the grass at regular intervals, thereby reducing the cotton to a regular and uniform stand in the row. The wing-plows follow the cotton-chopper, throwing the soil to the young cotton and clearing the space between the rows from weeds and grass. In due time the wing-plows and the chopper may be removed and the cotton plowed once or twice with the wing-plows alone.

In the drawing, 1 and 2 are the rear wheels. 3 3 are the front wheels. The axle 4 of wheels 1 and 2 is provided with a pinion-wheel, 5, which meshes into teeth of curved rack 6. Curved rack 6 is provided with a slot, 5 5, which receives a rod passing from side to side of slider 7, said rod serving to keep rack 6 continually in gear with pinion-wheel 8. The mandrel of pinion 8 passes through and has its bearings in the sides of slider 7. A ratchet-wheel, 9, is fixed upon said mandrel, and a pawl on the end of lever 10 catches into it and holds pinion 8, and, consequently, the curved rack 6, with which it gears in any desired position. A wheel, 11, provided with handles on its inside, is secured to the end of mandrel of pinion 8, and serves to elevate or depress frame 14, to which the wing-plows 15 and 16 are attached, by elevating or depressing curved rack 6, which is connected to frame 14 by a rod, 54, passing through the lower end of rack 6 and fastened at each end to frame 14. Angular frame 14 may be elevated or depressed by gearing curved rack 6 with pinion-wheel 5 when the machine is in motion. In this case the rack must be thrown immediately out of gear with pinion 5 when the frame 14 is in the desired position. Pinion 5 is continually in motion when the machine is moving, and when the pinion has reached the end of the teeth in rack 6 it must be thrown out of gear or it will be broken. Lever 12 is connected to slider 7 and also to gate 13. When the power end of lever 12 is drawn backward slider 7 and curved rack 6 are moved forward and rack 6 is geared with pinion 5; at the same time gate 13 is moved forward and prevents the seed and guano from escaping from hoppers 28 and 29. When lever 12 is pushed forward rack 6 is thrown out of gear with pinion 5, slider 7 is moved back to its former position, and gate 13 is opened as before. Plows 15 are provided with shifting-wings 16. These wings are secured to one end of arms 17 by a bolt and nut, so that their upper edges slide in grooves made in the shanks of plows 15; their lower ends or points work loosely upon bolts passing through them and plows 15. The upper ends of arms 17 are secured to a cranked lever, 56, which works upon the upper side of the beams of frame 14 so as to throw wings 16 either to the right or left, causing the soil to be thrown to or from the center of the machine at the will of the operator. The frame 14 is connected with a curved lever, 19, which is forked at its upper end and connected with an angle-knee, 20, provided with two prongs at each end, and having its fulcrum on a bolt passing through the vertex of the angle into the frame of the machine. The upper end of angle-knee 20 is secured to one end of a rod, 21, the other end of said rod being secured to a cuff, 22. Cuff 22 is provided with a lateral slot, shown by dotted lines 57, and is held in a recess, 58, in curved arm 59, by a bolt passing through slot 57, so that it may be elevated or depressed; cuff 22, being therefore connected with frame 14 through rod 21, angle-knee 20, and curved lever 19, is elevated or depressed every time the frame is. Cuff 22 has three holes, provided with bolts and nuts for securing to it plows 23 23 and 24; plow 24 being used for marking the ground when planting the seed, plows 23 23 being used when cultivating the young cotton for scraping off and reducing the rows to the desired width. Rear wheel 2 has an annular row of teeth, 44, which meshes into pinion 25. The mandrel of pinion 25 is provided with a pulley, 26, which communicates motion by a cord to a pulley, 27, which revolves a feeder, 60, causing it to feed the seed and guano into the furrow as it is opened by plow 24. The cotton-seed and guano are placed in the hoppers 28 and 29, hopper 29 being used for guano. These hoppers are provided with gates 30 and 31 for regulating the supply of seed and guano. A wheel, 51, provided with a pin near its rim, is secured to the end of the mandrel of pinion 25. Cotton-chopper 32 is secured to the pin in wheel 51; the handle is curved to enable the chopper to make a proper stroke upon the ground. The chopper 32 makes its strokes at equal distances apart, the distance being neither increased nor diminished by increasing or diminishing the speed of the machine. The chopper is elevated to make the stroke by having its handle arranged to work in a ring-shaped staple or guide, 61, which is secured to lever 33 on the right side of the machine. When in operation it chops out the weeds and grass and reduces the cotton to a regular and uniform stand in a row. The frame 35 of the machine should be firmly and strongly constructed in order to resist the strain which must necessarily come upon it. The greater portion of the weight of frame 35 comes upon axle 4, to which it is secured by boxes bolted to the under side of the frame. The two longest rails of the frame 35, called "hopper-rails," to which cuff 22 is secured, extend over the front wheels 3 3. The vertical axle 34 passes up through the hopper-rails, where they meet at the front of the frame 35, and has a strap bolted to its lower end, which encircles the axle of wheels 3 3, thereby connecting the two axles. Vertical axle 34 is also provided with a lever, 43, upon which the front of the hopper-rails rests when not elevated by levers 33 33. A curved strap, 36, provided with a hole in each end for the reception of points of levers 33 33, is secured to the top of vertical axle 34. Levers 33 33 are secured to the sides of the hopper-rails by bolts 53, which serve as fulcrums for said levers. The points of levers 33 33 rest in the holes in the ends of curved strap 36, and the power ends rest in notches in a curved strap, 37, secured to the top of curved rack 6. Plows 23 23 and 24 may be adjusted to plow deep or shallow by levers 33 33, which can be used to elevate or depress the front of frame 35 upon the vertical axle 34. Two straps, 38 38, forming two elongated curved hooks and secured to the rear cross-piece of frame 35, receive a rod, 39, to which the rear of frame 14 is fastened. Straps 38 38 describe a curve similar to the curve of rack 6, and govern the direction of the angular frame 14 when it is being elevated, causing the plows 15 to be drawn back so as to avoid obstacles with which they may be in contact. Lever 40 is connected by a hooked rod with sliding nut 41, which slides in a groove in axle 4, and is provided with a pin which enters a perforated plate upon the inside of rear-wheel 1, causing said wheel to revolve with axle 4. When sliding nut 41 is disengaged from the plate on wheel 1 the machine can be turned to the right or left with greater facility. The knocker-off 42 is secured to rod 39, and also connected with the lower end of curved rack 6 by a jointed strap, 62, so that it may be adjusted as desired. It is only used when planting the seed, and its office is to knock off a portion of the ridge formed by the plows 15 and 16. Two curved hounds, to which the tongue of the machine is attached, are secured to lever 43.

Having thus described my invention, what I claim as new, and desire to secure by Letters Patent, is—

1. The shifting-wing 16, arms 17, and cranked levers 56, constructed and arranged as described, in combination with plows 15 and angular frame 14, for the purpose set forth.

2. Cuff 22, rod 21, angle-knee 20, curved lever 19, angular frame 14, and curved rack 6, all constructed as described, and arranged relatively one to the other as set forth.

3. Wheel 2 provided with an annular row of teeth 44, pulleys 26 and 27, shaft and pinion 25, carrying also wheel 51, arranged relatively one to the other, as and for the purpose specified.

4. Curved rack 6, pinion 8, pawl 10, ratchet 9, handle-wheel 11, and slider 7, arranged relatively to each other and to lever 12 and pinion 8, as and for the purposes set forth.

MIREYBEAU B. LAMAR.

Witnesses:
J. M. McAfee,
John W. Butler.